United States Patent Office 3,301,808
Patented Jan. 31, 1967

3,301,808
AQUEOUS AEROSOL FILM FORMING
COMPOSITIONS
George R. Mack, Jr., Allentown, and Milton Freifeld, Easton, Pa., assignors to General Aniline & Film Corporation, New York, N.Y., a corporation of Delaware
No Drawing. Filed May 12, 1964, Ser. No. 366,900
4 Claims. (Cl. 260—29.6)

This invention relates to aqueous aerosol film forming compositions of matter and more particularly to nonflammable aqueous aerosol compositions having improved storage stability, mechanical stability, corrosion inhibition and other properties.

It is an object of the present invention to provide nonflammable aqueous aerosol compositions having excellent storage stabilities and long shelf lives. Another object of this invention is to provide aqueous aerosol compositions with improved mechanical stability which do not coagulate under stress so that the nozzle does not clog during spraying. A further object of this invention is to provide aqueous aerosol compositions having improved corrosion inhibition properties. Another object is to provide aqueous compositions of film forming agents which may be formulated with a variety of solvents as well as polymers. Another object of this invention is to provide film forming compositions which are useful in the full range of aerosol formulations. A further object is to provide aqueous aerosol film forming formulations which eliminate or minimize use of flammable solvents. Another object of this invention is to provide aqueous aerosol film forming formulations in which a wide variety of gas propellents may be used. Still another object of this invention is to provide aqueous aerosol film forming compositions having lower viscosities than those known in the prior art. A further object is to provide aqueous aerosol film forming formulations which are useful as hair fixatives media, synthetic starches, adhesives, protective coatings, shoe polishes, sizes for textiles or the like. Other objects and advantages of the present invention will appear as this description proceeds.

The attainment of the objects of this invention is made possible by our discovery that nonflammable aqueous sprayable film forming compositions may be formulated by using a mixture of an aqueous emulsion of a graft copolymer of an N-vinyl lactam polymer having the formula (1)

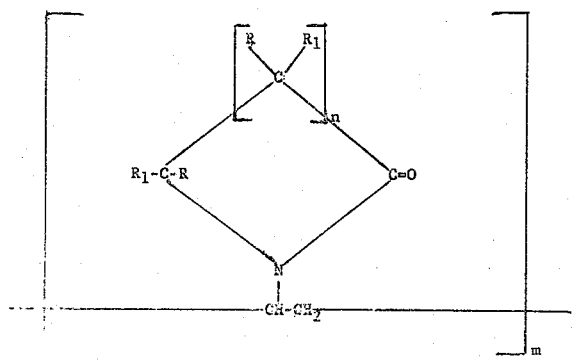

wherein R is hydrogen, methyl or ethyl, $R_1$ is hydrogen, methyl or ethyl, $n$ is an integer of from 2 to 4 and $m$ is the number of N-vinyl lactam units in the polymer ranging from 4 to 20,000, the graft copolymer being prepared in an aqueous medium by reacting a nonaqueous vinyl monomer selected from the group consisting of vinyl acetate, isopropenyl acetate, vinyl laurate, vinyl stearate, vinyl oleate, vinyl benzoate, vinyl chloride, 2-chloropropene, methyl vinyl ether, ethyl vinyl ether, isopropyl vinyl ether, isobutyl vinyl ether, 2-oxyethyl vinyl ether, phenyl vinyl ether, methyl acrylate, ethyl acrylate, methyl methacrylate, 2-ethylhexyl acrylate, hexyl acrylate, styrene, methoxystyrene, ethylstyrene, chlorostyrene or the like with the polymer in the presence of a free radical supplying polymerization catalyst, and an aerosol propellent selected from the group consisting of a chlorofluoroalkane hydrocarbon having from 1 to 2 carbon atoms and from 0 to 2 unreplaced hydrogens, low boiling hydrocarbons having from 1 to 4 carbon atoms, nitrogen, nitrous oxide, carbon dioxide or the like to obtain nonflammable aqueous sprayable film forming compositions having improved storage stability, corrosion inhibition and other desirable properties.

N-vinyl lactam polymers characterized by Formula 1 are commercially available in a variety of forms, concentrations and molecular weights. Methods for the manufacture of these polymers are well known in the art. For example, U.S. Patent 2,317,804 discloses a suitable method for preparing N-vinyl lactams. U.S. Patents 2,265,450 and 2,335,454 disclose methods for preparing N-vinyl lactam polymers and their aqueous solutions.

N-vinyl lactams which may be employed to produce aqueous solution of N-vinyl lactam polymers for use in preparing graft copolymers for this invention include the N-vinyl derivatives of gamma, delta and epsilon lactams (N-vinyl derivatives of the cyclic amides of gamma, delta and epsilon aminocarboxylic acids of the aliphatic series) and the lower alkyl (methyl or ethyl) substituted derivatives of such lactams. Among this group, N-vinyl-2-pyrrolidone (otherwise referred to as 1-vinyl-2-pyrrolidinone) is a preferred monomer. As further examples of N-vinyl lactams operative herein, and which may be prepared in known manner by N-vinylation of the corresponding lactams at elevated temperatures in the manner disclosed in U.S. Patent 2,317,084, there may be mentioned the N-vinyl-substituted derivatives of the following lactams:

3,3-dimethyl-2-pyrrolidone,
4,4-dimethyl-2-pyrrolidone,
5,5-dimethyl-2-pyrrolidone,
3-ethyl-2-pyrrolidone,
4-ethyl-2-pyrrolidone,
5-ethyl-2-pyrrolidone,
3-methyl-2-pyrrolidone,
4-methyl-2-pyrrolidone,
5-methyl-2-pyrrolidone,
3,3,5-trimethyl-2-pyrrolidone,
3,5,5-trimethyl-2-pyrrolidone,
4,5,5-trimethyl-2-pyrrolidone,
2-piperidone,
5,5-diethyl-2-piperidone,
5,6-dimethyl-2-piperidone,
4-ethyl-2-piperidone,
6-ethyl-2-piperidone,
5-ethyl-6-methyl-2-piperidone,
6-ethyl-3-methyl-2-piperidone,
3-methyl-2-piperidone,
4-methyl-2-piperidone,
5-methyl-2-piperidone,
6-methyl-2-piperidone,
2-caprolactam,
3,6-dimethyl-2-caprolactam,
4,6-dimethyl-2-caprolactam,
4,7-dimethyl-2-caprolactam,
7,7-diethyl-2-caprolactam,
3-ethyl-2-caprolactam,
5-ethyl-2-caprolactam,
6-ethyl-2-caprolactam,
7-ethyl-2-caprolactam,
4-ethyl-6-methyl-2-caprolactam, 6-ethyl-4-methyl-2-caprolactam,
3-methyl-2-caprolactam,
4-methyl-2-caprolactam,
5-methyl-2-caprolactam,
6-methyl-2-caprolactam
or the like.

Nonaqueous vinyl monomers which may be used in the preparation of N-vinyl lactam graft polymers include vinyl acetate, isopropenyl acetate, vinyl laurate, vinyl stearate, vinyl oleate, vinyl benzoate, vinyl chloride, 2-chloropropene, methyl vinyl ether, ethyl vinyl ether, isopropyl vinyl ether, isobutyl vinyl ether, dodecyl vinyl ether, octadecyl vinyl ether, phenyl vinyl ether, 2-oxyethyl vinyl ether, methyl methacrylate, ethyl acrylate, 2-ethylhexyl acrylate, hexyl acrylate, dodecyl acrylate, octadecyl acrylate, styrene, 2-methoxystyrene, 2-methylstyrene, 2-chlorostyrene, 2-ethylstyrene, their isomers, their mixtures or the like. A preferred group of vinyl monomers for use in preparing graft polymers of N-vinyl lactams is the acrylic ester monomers described in the copending application of Grosser and Leibowitz Serial Number 69,572, filed November 16, 1960, now Patent No. 3,244,658. Another preferred vinyl monomer is styrene whose use in preparing graft polymers of N-vinyl lactams is described in the copending application of Grosser and Leibowitz Serial Number 69,571, filed November 16, 1960, now Patent No. 3,244,657.

Briefly, the process for preparing N-vinyl lactam graft copolymers involves reaction of a N-vinyl lactam polymer in an aqueous medium with a nonaqueous dissimilar vinyl monomer under polymerization conditions in the presence of a free radical supplying polymerization catalyst. Molecular weights of water soluble N-vinyl lactam polymers useful in preparing the graft copolymers may range from about 400 to 2,000,000 or higher. The molecular weight of the N-vinyl lactam polymer will depend on the degree of polymerization. Usually the degree of polymerization and the relative molecular weights of these polymers are expressed in terms of Fickentscher K values. The method of determining these values is given in Modern Plastics, 23, No. 3, 157–61, 212, 214, 216, 218 (1945). N-vinyl lactam polymers having K values of about 10 to 200 and preferably about 20 to 60 or their mixtures are used in preparing graft copolymers for this invention. The graft copolymerization reaction is substantially quantitative in that emulsions are produced containing the N-vinyl lactam polymer-vinyl monomer copolymer in the dispersed nonaqueous phase with little or no polymeric products being dissolved in the continuous aqueous phase. The weight ratio of N-vinyl lactam polymer to vinyl monomer which is used in preparing these graft copolymers is optional depending on the desired properties, preferably ranging from about 5:95 to 60:40. Usually it is desirable to carry out the graft polymerization in such a manner that the finished aqueous emulsion contains from about 10 to 60% graft copolymer.

The significant differences between these N-vinyl lactam copolymers and other types of N-vinyl lactam polymers is illustrated schematically below in Formulas 2 to 6 inclusive wherein A represents a N-vinyl lactam monomer and B represents a dissimilar nonaqueous vinyl monomer.

(a) Vinyl homopolymer

—A—A—A—A—A—A— (2)

(b) Random type copolymers

—A—B—A—A—B—B—A— (3)

(c) True interpolymer copolymers

—A—B—A—B—A—B—A—B— (4)

(d) Block copolymers

—A—A—A—B—B—B—A—A— (5)

(e) Graft copolymers

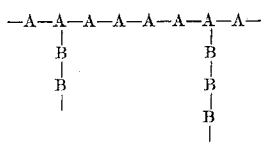
(6)

The attainment of the objects of this invention with emulsion graft copolymers of N-vinyl lactam homopolymers is completely unexpected because satisfactory nonflammable aqueous sprayable film forming aerosol compositions are not obtained with N-vinyl lactam homopolymers or with N-vinyl lactam random type copolymers. Emulsions of these graft copolymers have a number of advantages in the aerosol formulations disclosed in this invention. Aqueous aerosol formulations containing emulsions of graft copolymers have excellent emulsion stabilities. These emulsions have low to medium viscosities, which are usually below 2500 cps. (centipoises—Brookfield Viscosimeter) and produce low to medium viscosity aerosol formulations. Aerosol formulations containing these emulsions form clear transparent films on glass plate. These films are essentially water soluble and are also soluble to the extent of 90% in benzene which indicates that the principal component in the emulsion is a graft copolymer and that little if any other polymeric products are dissolved in the aqueous phase. Aerosol formulations prepared with graft copolymers have excellent storage stabilities and long shelf lives. They also have improved mechanical stabilities. They do not coagulate under stress and the spray nozzle does not clog even when the entire contents of the aerosol container are dispensed. These emulsions also have excellent emulsion stabilities in aerosol formulations. These aerosol emulsions can be easily reformed by mild agitation after they separate into two layers. The stability of these emulsion formulations may be further improved by incorporation of minor amounts of emulsifiers, stabilizers, viscosity modifiers or the like into the formulations.

In contrast to the above aerosol formulations of emulsion graft copolymers, aerosol formulations containing emulsions of random type copolymers obtained by polymerization of a N-vinyl lactam monomer and a dissimilar vinyl monomer in about the same proportions by the methods known in the prior art yield unstable aerosol emulsions when they are used under the same conditions in aerosol formulations. Since the emulsions of random type copolymers produced by the methods of the prior art may have viscosities as high as 75,000 cps. or more, they produce aerosol emulsion formulations which have viscosities that are too high to be satisfactory for many purposes. Furthermore, aerosol formulations prepared with these copolymers produce opaque films on glass plate. Examination of these films indicates that the films are soluble only to the extent of 50% in benzene. This indicates that the random type copolymers produced by the prior art are mixtures of water soluble N-vinyl lactam polymers, benzene soluble vinyl polymers of the dissimilar vinyl monomer, water soluble random type copolymers and benzene soluble random type copolymers rather than a graft copolymer. The usual procedure employed in the formulation of aerosols with these random type copolymers is to evaporate water from the polymeric emulsion to obtain an anhydrous mixture of the copolymers. These dried copolymers are then dissolved in a suitable nonaqueous solvent to produce a clear solution which is used to formulate a solvent base aerosol. Results obtained with random type copolymers used in the prior art further demonstrate the advantages of the graft copolymer emulsions over those obtained by the prior art in aqueous aerosol formulations.

Emulsions of graft copolymers of N-vinyl lactam homopolymers may be formulated with aerosol propellents selected from the group consisting of a chlorofluoroalkane hydrocarbon from 1 to 2 carbon atoms and from 0 to 2 unreplaced hydrogens, low boiling hydrocarbons having from 1 to 4 carbon atoms, nitrogen, nitrous oxygen, carbon dioxide, or the like. While any liquefiable gas having the proper vapor pressure and other physical properties may be used, generally gases which are easily liquefiable and do not require high pressures for their liquefication are preferred.

Fluorinated and chlorinated hydrocarbons of the general types described above may be used in this invention. As specific examples of chlorofluorohydrocarbons useful in this invention there may be mentioned trichloromonofluoromethane, dichlorodifluoromethane, monochlorotrifluoromethane, monochlorodifluoromethane, trichlorodifluoroethane, trichloromonofluoroethane, dichlorodifluoroethane, dichlorotetrafluoroethane, monochlorodifluoroethane, trifluoroethyl chloride, their isomers or their mixtures. In the present invention trichloromonofluoromethane, dichlorodifluoromethane and mixtures of these materials are particularly useful.

Low boiling hydrocarbons having from 1 to 4 carbon atoms may be used. Hydrocarbons such as methane, ethane, butane, their isomers and their mixtures may be employed. Normally these hydrocarbons are not used in aerosol formulations because they are flammable. However, in the present invention where aqueous emulsions of film forming materials are employed instead of solutions containing flammable solvents, these hydrocarbons may be used as propellents because the water present in the aqueous phase of the formulation suppresses flammability. Unsaturated hydrocarbons having from 1 to 4 carbons as well as their halogen derivatives may be used.

Gases such as nitrogen, nitrous oxide and carbon dioxide may also be used. Although some of these gases require high pressures for compression, the pressure problem may be solved by the use of very strong containers or by storage at low temperatures. In certain applications, it may even be desirable to use mixtures of these gases with the halogenated or unsubstituted hydrocarbon described above.

The following examples are illustrative of the present invention and are not to be regarded as limitative. It will be understood that all parts, percentages and proportions referred to herein and by the appended claims are by weight unless otherwise indicated.

*Example 1*

An emulsion of the graft copolymer of N-vinyl-2-pyrrolidone polymer and styrene having a weight ratio of 50:50 and made as disclosed in Example 2 of Serial Number 69,571 filed November 16, 1960, using equal parts by weight of polyvinylpyrrolidone and styrene, is diluted with sufficient water to given an emulsion containing 2% of the graft copolymer solids. A 10 g. sample of the 2% graft copolymer is placed in a Fischer-Porter glass compatibility tube. The "cold" fill technique as described on pages 244 to 248 in "Aerosol-Science and Technology," H. R. Shepherd (Interscience Publishers, Inc., New York, N.Y., 1961) is used to add 40 g. of a 1:1 mixture of trichloromonofluoromethane and dichlorodifluoromethane. The resulting aerosol mixture is a relatively stable homogeneous emulsion which separates into two phases after 30 minutes. The homogeneous emulsion may be reformed by mild agitation after it separates into two layers. The spray qualities of the emulsion through a standard nozzle (hair spray type) are excellent. Examination of the nozzle reveals no evidence of clogging. Flammability characteristics are determined by the flame projection test as described on pages 265 to 267 in "Aerosol-Science and Technology." The formulation is nonflammable. This formulation is useful as an aerosol starch.

*Example 2*

A graft copolymer emulsion of N-vinyl-2-pyrrolidone polymer and styrene having a weight ratio of 30:70 and made as disclosed in Example 2 of Serial Number 69,571 filed November 16, 1960, using 3 parts of polyvinylpyrrolidone to 7 parts of styrene by weight, 23 parts are formulated with 0.5 part of a nonionic surfactant prepared by the reaction of 1.5 moles of ethylene oxide with 1 mole of nonylphenol and 0.5 part of polyethylene glycol fatty ester. This formulation produces a very stable emulsion. The emulsion is diluted with sufficient water to give an emulsion containing 5% of graft copolymer solids. A 60 g. sample of this 5% graft copolymer emulsion is placed in a Fischer-Porter glass compatibility tube. The "cold" fill technique described in Example 1 is used to add 30 g. of trichloromonofluoromethane and 20 g. of dichlorodifluoromethane. The resulting aerosol mixture is a relatively stable homogeneous emulsion which slowly separates into two phases over 24 hours. The emulsion may be reformed readily by mild agitation after it separates into two layers. The spray qualities of the emulsion through a standard nozzle are excellent. A fine spray is obtained and no clogging of the nozzle is noted even if spraying was continued until the charge is exhausted. This formulation is also nonflammable and is useful as an aerosol starch.

A duplicate sample of the formulation is prepared and stored for six months. Examination of this sample after storage reveals that its spray qualities are comparable to those obtained with a freshly prepared sample.

*Example 3*

An emulsion containing 40% of the graft copolymer of N-vinyl-2-pyrrolidone and ethyl acrylate having a weight ratio of 50:50 is used to prepare an aqueous nonflammable aerosol formulation following the procedure described in Example 1. Examination of the aerosol formulation reveals that it has excellent spray qualities, film forming properties and nonflammability properties. Laboratory evaluation shows that the formulation has excellent properties as a hair fixative. It produces films which have flexibility, rewettability and dispersability in excessive amounts of water as well as redrying properties.

The above examples demonstrate how emulsions of graft copolymers of N-vinyl lactam homopolymers may be used in aqueous hair spray formulations. Other uses of these emulsions in aqueous aerosol formulations include fungicides, bactericides, antiseptics, sun tan sprays, anti-perspirants, deodorants, depilatories, hair tints, poison ivy remedies, permanent hair waving solutions, skin freshener lotions, astringent lotions, insect bite lotions, insect repellents, metal cleaners, metal polishes, anti-fogants, glass cleaners, stain removers, starch glosses, mothproofers, shoe dressing preparations, leather cleaners, air deodorizers, antistatic agents, protective coatings, furniture polishes, shaving creams, floor waxes, sprayable bandages, or the like. In many of these applications the graft copolymer is used as a film forming agent to act as a matrix which holds the active ingredient in a fixed place so that the active ingredient will be more effective. One such application is where the graft copolymer is used in an insecticide formulation as an adhesive which holds particles of the insecticide on the treated surface to assure more effective use of the insecticide.

This invention has been disclosed with respect to certain preferred embodiments and various modifications and variations thereof will become obvious to persons skilled in the art. It is to be understood that such modifications and variations are to be included within the spirit and scope of this invention.

What is claimed is:
1. A nonflammable aqueous sprayable film forming composition consisting essentially of (1) an aqueous emul- sion of a graft copolymer of a N-vinyl lactam polymer of the formula

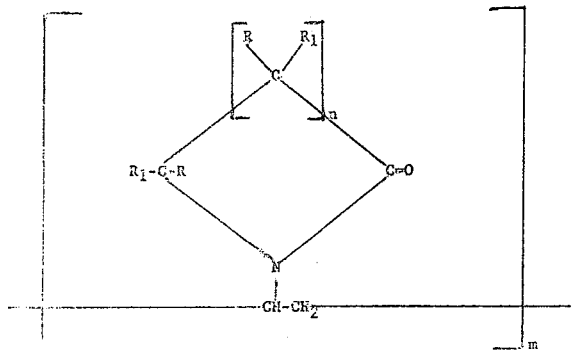

wherein R is a member selected from the group consisting of hydrogen, methyl and ethyl, $R_1$ is a member selected from the group consisting of hydrogen, methyl and ethyl, $n$ is an integer of from 2 to 4, and $m$ is an integer of from 4 to 20,000, prepared by reacting from 5 to 60 part by weight of the N-vinyl lactam polymer with from 95 to 40 parts by weight of a nonaqueous vinyl monomer selected from the group consisting of vinyl acetate, isopropenyl acetate, vinyl laurate, vinyl stearate, vinyl oleate, vinyl benzoate, vinyl chloride, 2-chloropropene, methyl vinyl ether, ethyl vinyl ether, isopropyl vinyl ether, isobutyl vinyl ether, 2-oxyethyl vinyl ether, phenyl vinyl ether, methyl acrylate, ethyl acrylate, methyl methacrylate, 2-ethylhexyl acrylate, hexyl acrylate, styrene, methoxystyrene, ethylstyrene and chlorostyrene, under polymerization conditions in the presence of a free radical supplying polymerization catalyst, and (2) an aerosol propellent selected from the group consisting of a chlorofluoro alkane hydrocarbon having from 1 to 2 carbon atoms and from 0 to 2 unreplaced hydrogen atoms, a low boiling hydrocarbon having from 1 to 4 carbon atoms, nitrogen, nitrous oxide and carbon dioxide.

2. A composition as defined in claim 1 wherein the graft copolymer is a copolymer of N-vinyl-2-pyrrolidone polymer and styrene having a weight ratio of 50:50.

3. A composition as defined in claim 1 wherein the graft copolymer is a copolymer of N-vinyl-2-pyrrolidone polymer and styrene having a weight ratio of 30:70.

4. A composition as defined in claim 1 wherein the graft copolymer is a copolymer of N-vinyl-2-pyrrolidone and ethyl acrylate having a weight ratio of 50:50.

References Cited by the Examiner
UNITED STATES PATENTS

| | | | |
|---|---|---|---|
| 2,995,278 | 8/1961 | Clapp | 252—305 |
| 3,244,657 | 4/1966 | Grosser et al. | 260—29.6 |
| 3,244,658 | 4/1966 | Grosser et al. | 260—29.6 |

MURRAY TILLMAN, *Primary Examiner.*

W. J. BRIGGS, SR., *Assistant Examiner.*